(12) United States Patent
Copparapu et al.

(10) Patent No.: US 12,200,118 B1
(45) Date of Patent: *Jan. 14, 2025

(54) APPLICATION PROGRAMMING INTERFACE TO GENERATE DATA KEY PAIRS

(71) Applicant: Amazon Technologies, Inc., Seattle, WA (US)

(72) Inventors: Rajkumar Copparapu, Sammamish, WA (US); Peter Da-Ming Zieske, Seattle, WA (US); Benjamin Elias Seidenberg, Seattle, WA (US); Justin Jon Derby, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,268

(22) Filed: Apr. 28, 2023

Related U.S. Application Data

(63) Continuation of application No. 16/699,452, filed on Nov. 29, 2019, now Pat. No. 11,671,251.

(51) Int. Cl.
*H04L 9/08* (2006.01)
*G06F 9/54* (2006.01)
*H04L 9/06* (2006.01)

(52) U.S. Cl.
CPC ............ *H04L 9/0877* (2013.01); *G06F 9/541* (2013.01); *G06F 9/546* (2013.01); *H04L 9/0618* (2013.01)

(58) Field of Classification Search
CPC ..... H04L 9/0877; H04L 9/0618; G06F 9/541; G06F 9/546
See application file for complete search history.

(56) References Cited

U.S. PATENT DOCUMENTS

| | | | |
|---|---|---|---|
| 7,093,295 B1 | 8/2006 | Saito | |
| 7,983,423 B1* | 7/2011 | Agarwal | H04L 9/0891 380/278 |
| 9,722,974 B1 | 8/2017 | Fuller et al. | |
| 10,979,403 B1* | 4/2021 | Mutescu | H04L 9/0631 |
| 2003/0021420 A1 | 1/2003 | Kamperman et al. | |
| 2003/0126457 A1 | 7/2003 | Kohiyama et al. | |
| 2005/0010763 A1 | 1/2005 | Matsui et al. | |
| 2005/0144478 A1 | 6/2005 | Yamanaka et al. | |
| 2006/0149965 A1* | 7/2006 | Sharma | H04L 63/08 713/163 |
| 2007/0055891 A1 | 3/2007 | Plotkin et al. | |
| 2007/0220279 A1 | 9/2007 | Northcutt et al. | |
| 2008/0235508 A1 | 9/2008 | Ran et al. | |

(Continued)

OTHER PUBLICATIONS

NIST, "Security Requirements for Cryptographic Modules," Federal Information Processing Standards Publication (FIPS PUB 140-2), National Institute of Standards and Technology, Issued May 25, 2001, 69 pages.

*Primary Examiner* — Vu V Tran
(74) *Attorney, Agent, or Firm* — Davis Wright Tremaine LLP

(57) ABSTRACT

A computer-implemented method for providing cryptographic services, including providing key pairs. A key management service receives a web service application programming interface or other such request to generate a key pair. To respond to the request, the key management service obtains a pregenerated key pair that is securely stored and provides the key pair in response to the request.

20 Claims, 13 Drawing Sheets

(56) References Cited

U.S. PATENT DOCUMENTS

| | | |
|---|---|---|
| 2009/0097642 A1 | 4/2009 | Schnell et al. |
| 2009/0214044 A1 | 8/2009 | Kinoshita |
| 2011/0038477 A1 | 2/2011 | Bilodi |
| 2012/0137139 A1 | 5/2012 | Kudoh et al. |
| 2013/0070925 A1 | 3/2013 | Yamada et al. |
| 2015/0270957 A1 | 9/2015 | Uzun |
| 2016/0065364 A1 | 3/2016 | Amiri et al. |
| 2016/0352518 A1 | 12/2016 | Ford et al. |
| 2017/0085540 A1 | 3/2017 | Avanzi et al. |
| 2017/0093569 A1* | 3/2017 | Roth ................... H04L 9/14 |
| 2017/0279607 A1* | 9/2017 | Kent .................. H04W 12/37 |
| 2017/0359174 A1 | 12/2017 | Tamura et al. |
| 2018/0012032 A1 | 1/2018 | Radich et al. |
| 2018/0041341 A1 | 2/2018 | Gulati |
| 2018/0062835 A1 | 3/2018 | Hamel et al. |
| 2018/0083933 A1 | 3/2018 | Mullen et al. |
| 2018/0332011 A1 | 11/2018 | Gray |
| 2018/0357426 A1 | 12/2018 | Pearson et al. |
| 2019/0089529 A1 | 3/2019 | Conway et al. |
| 2019/0124057 A1 | 4/2019 | Smirnoff et al. |
| 2019/0340251 A1 | 11/2019 | Peddada et al. |
| 2019/0347435 A1 | 11/2019 | Zheng et al. |
| 2020/0053065 A1* | 2/2020 | Wisniewski ........... H04L 63/06 |
| 2020/0169401 A1 | 5/2020 | Dooley et al. |
| 2020/0304299 A1* | 9/2020 | Medvinsky .......... H04L 9/0844 |
| 2021/0051002 A1 | 2/2021 | Cheng et al. |
| 2021/0056547 A1 | 2/2021 | Monica et al. |

* cited by examiner

APPLICATION PROGRAMMING INTERFACE TO GENERATE DATA KEY PAIRS

CROSS-REFERENCE TO RELATED APPLICATIONS

This application is a continuation of U.S. patent application Ser. No. 16/699,452, filed Nov. 29, 2019, entitled "APPLICATION PROGRAMMING INTERFACE TO GENERATE DATA KEY PAIRS," the disclosure of which is hereby incorporated herein in its entirety. This application also incorporates by reference for all purposes the full disclosure of co-pending U.S. patent application Ser. No. 16/699,406, filed Nov. 29, 2019, entitled "DATA REENCRYPTION TECHNIQUES."

BACKGROUND

In modern computing systems and environments, security for systems and data is increasing in importance. While cryptographic operations have become ubiquitous in electronic communications, data storage, and other computing related contexts, maintaining the integrity of data involved in the cryptographic operations is a challenge. As roles and permissions allowing access secured data to can change, cryptographic information used to access secured data or portions of secured data can also need to change. For example, organizations and the systems that support their operations are becoming increasingly complex. Maintaining data security in this context involves substantial efforts. For example, computer systems and their subsystems can utilize various keys to encrypt or otherwise cryptographically protect not only their internal data, but data of their customers. Not only do these systems evolve over time, but the standards in which they operate do as well. Consequently, managing the keys and maintaining protection of the data involves a significant amount of time and resources to keep up with these changes.

BRIEF DESCRIPTION OF THE DRAWINGS

Various techniques will be described with reference to the drawings, in which.

DETAILED DESCRIPTION

Figure 1:
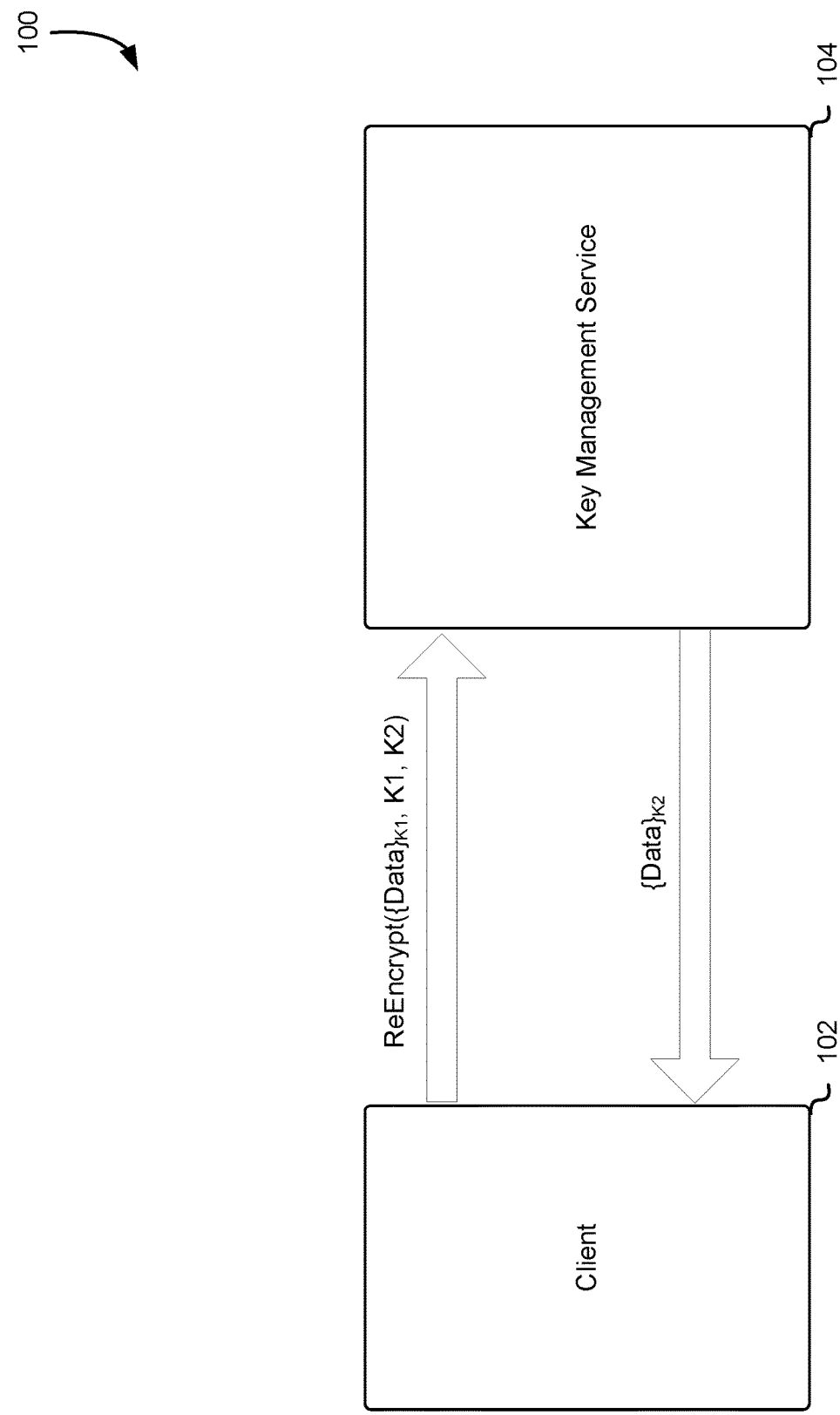
FIG. 1 is a block diagram depicting an embodiment of a system for reencrypting data with a key management service.

Techniques described and suggested herein include methods, systems and processes to provide cryptographic services over a network. In one example, a computing resource service provider operates a key management service (often referred to as "KMS") as a multi-tenant service that manages cryptographic keys on behalf of customers of the computing resource service provider. The key management service provides an interface to which requests can be submitted by customers' computing devices to cause operations related to the cryptographic keys to be performed. In one example, the key management service provides a web service application programming interface to which web service application programming interface (API) calls can be submitted to cause the key management service to perform corresponding operations. The operations that the key management service performs can include operations related to the creation and other management of keys stored by the key management service. The operations can also include cryptographic operations themselves, such as encryption, decryption, digital signature verification, and key generation.

In one example, the interface of the key management service processes requests to reencrypt data from one key to another. Such requests can specify (e.g., with request parameters indicating key identifiers) the key under which the data is currently encrypted and the key to which the data is to be encrypted. To process such a request (which can be referred to as a "reencrypt request"), the key management service can use one key to decrypt the data and another key to encrypt the data, then send the newly encrypted data in a response to the request. In some examples, the key management service is able to change the type of key under which the data is encrypted during the reencryption process. For instance, a request can specify that data currently encrypted under a symmetric key is to be reencrypted to an asymmetric key (e.g., a public key of a key pair that comprises the public key and a corresponding private key). The request can also specify additional detail, such as the cryptographic algorithm to use to decrypt during the reencryption and another cryptographic algorithm to use when reencrypting the data. The key management service will process such calls according to the parameters stated in the request to update the security by which data is encrypted according to customer-set request parameters.

In another example, the interface of the key management service processes requests to generate data key pairs by providing data key pairs (i.e., where a data key pair comprises a public key and a corresponding private key) in response. Such requests can specify a key managed by the key management service (referred to as a managed key, customer managed key, master key, or customer master key) and responses to the requests can include a copy of the private key encrypted to the customer managed key. The encrypted private key can then be transmitted to the key management service to be decrypted by the customer managed key and provided back in plaintext form for use by the customer.

Generating cryptographically secure asymmetric key pairs generally consumes a large amounts of compute resources. Accordingly, to reduce latency when responding to requests to generate a data key, the key management service can pregenerate data key pairs and store the pregenerated data key pairs securely. In one example, the key management service stores pregenerated key pairs in a queue and responses to requests to generate data key pairs are generated by the key management service, in part, by dequeuing a data key pair from the queue. In some examples, requests parameters can specify a cryptographic algorithm or, generally, a type of data key pair to be provided in response to a generate data key pair request. In such examples, there can be a separate queue for each type of data key pair. The pregenerated data key pairs can be stored securely outside of hardware security module (HSM) boundaries (e.g., by being stored encrypted by a secret that is unexportably maintained securely within HSM boundaries and) or within the boundaries of an HSM itself. In some example, each HSM in a fleet of HSMs stores pregenerated data key pairs unexportably within its boundaries. Other variations, including those discussed in more detail below, are considered as being within the scope of the present disclosure.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain advantages, including some or all of the following: (1) improving security of data by updating the cryptographic key used to secure the data, (2) improving security by increasing flexibility of encryption protocols supported by reencryption service (e.g., enabling a web service to reencrypt data so as to migrate the encryption protocol used, such as migrating from encrypting under one key type to encrypting the data under a different key type, including migrating from a symmetric key using one algorithm to a different symmetric key using a different algorithm, migrating from a symmetric key to an asymmetric key, migrating from an asymmetric key to a symmetric key, or migrating from an asymmetric key using a particular algorithm to a different asymmetric key using a different algorithm), (3) improving security by reencrypting data without exposing plaintext beyond boundaries of a service provider performing reencryption (e.g., customer requesting reencryption of encrypted data is not presented with plaintext data during reencryption), and (4) reducing network latencies and reducing memory requirements of reencryption by generating key pairs in advance of receiving request for reencryption.

FIG. 1 is a block diagram depicting an embodiment of a system 100 for reencrypting data with a key management service 104. The key management service 104 is a system or service that is provided to a customer where the key management service 104 is configured to generate, exchange, store, use, destruct, and/or replace cryptographic keys on behalf of the customer such that cryptographic operations can be performed using the cryptographic keys. A key management service 104 can be a service provider service as described herein, such as operating by a web server 1306 and an application server 1308 described below in connection with FIG. 13.

A client computing device 102 can send an application programming interface (API) request to reencrypt data encrypted under a first key (e.g., K1) to be encrypted under a second key (e.g., K2). The client computing device 102 can be operated by or otherwise under the authority and/or authorization of a customer of a computing resource service provider that operates the key management service 104. The customer can be one of multiple customers that utilize the key management service 104. The key management service 104, in an embodiment, is a computer system (e.g., a distributed computer system) that operates an application programming interface to which clients can submit requests (e.g., web service application programming interface requests) to cause the key management service to perform corresponding operations involving the management and/or use of cryptographic keys. Note that while FIG. 1 and other figures, for the purpose of illustration show the client 102 submitting an API call (also called an API request) to the key management service 104 directly, such calls can be made indirectly and on by another device on behalf of the client 102. For instance, in some embodiments, a user can navigate a console presented a web page or other user interface and a server operating in connection with the interface can submit API requests on behalf of the client according to input into the user interface.

The API call can include the data to be reencrypted or an identifier of the data, such as a file path or web address. In this example, the ReEncrypt API call comprises data encrypted under a key identified by K1. Note that, for the purposes of this document, brackets "{" and "}" denote encryption and a subscript to the right bracket, when included, indicates a key to which the data is encrypted. The API call can include an identifier of the first key and an identifier of the second key, or the first key and the second key themselves (e.g., in encrypted form decryptable by the key management service 104). The first key identified by the API request for decryption can be a symmetric key or a portion of an asymmetric key, such as a private key. The second key identified by the API request for reencryption can be a symmetric key or a portion of an asymmetric key, such as a public key.

The API call can also include various metadata not illustrated. For example, other parameters that can be specified in the API call include, but are not limited to, grant tokens (such as to indicate when to schedule reencryption), the cryptographic algorithm used with the decrypt key, the cryptographic algorithm to be used with the encrypt key, and encryption context (such as additional data used to verify the authenticity of the API call or padding options).

An encryption context, in an embodiment, is an optional API parameter in the form of a set of key-value pairs and/or other information formatted in a different way, where the encryption context encodes contextual information about the data to be encrypted or decrypted. In an embodiment, the encryption context is used during encryption as additional authenticated data, which is data that is not encrypted with the data, but that is used when calculating a message authentication code (MAC) or other integrity information during the encryption process. In some embodiments, when AAD is used, decryption will fail unless the exact same AAD is provided as an input to the decryption.

In an embodiment, encryption context includes padding options. In some embodiments involving asymmetric keys, padding is the process of preparing a message for encryption or signing using a specification or scheme such as PKCS #1 v1.5, optimal asymmetric encryption padding (OAEP), probabilistic signature scheme (PSS), PSSR, IEEE P1363 EMSA2, and EMSA5. A modern form of padding for asymmetric primitives is OAEP applied to the RSA algorithm, when it is used to encrypt a limited number of bytes. The operation is referred to as "padding" as random material can be appended to the message to make it long enough for a cryptographic primitive. A padding can ensure that a potential attacker cannot manipulate the plaintext to exploit the mathematical structure of the primitive and will usually be accompanied by a proof, often in the random oracle model, that breaking the padding scheme is as hard as solving the hard problem underlying the primitive. For example, a key can be wrapped by the RSA PKCS #1 encryption scheme with a padding option, including the RSA encryption algorithm with Optimal Asymmetric Encryption Padding (OAEP) with the SHA-256 hash function (RSAES_OAEP_SHA_256), the RSA encryption algorithm with Optimal Asymmetric Encryption Padding (OAEP) with the SHA-1 hash function (RSAES_OAEP_SHA_1), or the RSA encryption algorithm with the padding format defined in PKCS #1 Version 1.5 (RSAES_PKCS1_V1_5).

The API call can also be sent by the client 102 with other information, such as a digital signature for the key management service 104 to use to authenticate the API call using a key that the key management service trusts, such as a symmetric key shared as a secret between the client 102 and the key management service 104 or a public key of a key pair. A computer system is said to trust a key if it operates according to logic that allows one or more operations to be performed as a result of using the key (e.g., for a cryptographic operation), where the operation would not otherwise be allowed. For example, the computer system can allow operations to be performed to fulfill an API request as a result of a digital signature being used to successfully validate a digital signature.

As illustrated in FIG. 1, a response to the ReEncrypt API call can be generated by the key management service 104 and transmitted to the client 102. In an embodiment, the response to the API call includes the data encrypted under a key identified by K2. Other data can be included in the response including, but not limited to, the algorithm used to reencrypt, the key identifier for K1, and the algorithm used with K1. Note that, while FIG. 1 illustrates a ReEncrypt API call, other types of API call are submittable to the key management service, such as other types of API calls described herein and others related to the management and/or use of cryptographic keys managed by the key management service 104.

Figure 2:
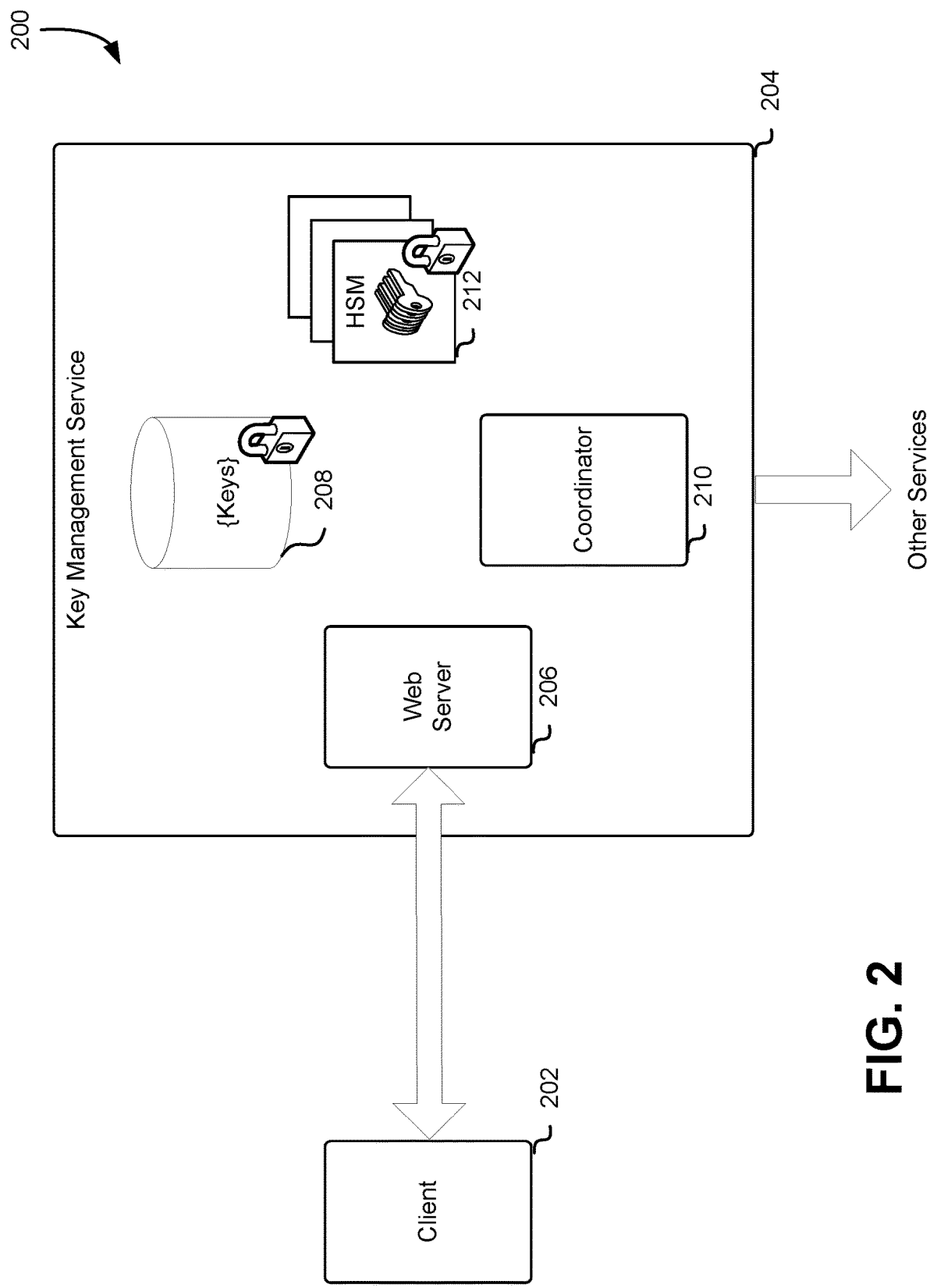
FIG. 2 is a block diagram depicting an embodiment of a system for generating and managing cryptographic keys.

FIG. 2 is a block diagram depicting an embodiment of a system 200 for generating and managing cryptographic keys at a key management service 204. As illustrated, the system can comprise a client 202 and a key management service 204, where the client 202 and the key management service 204 can be the client 102 and the key management service 104 described above.

The key management service 204, in an embodiment, comprises a web server 206, a data storage service 208, a coordinator 210, and a fleet of hardware security modules (HSMs) 212. The web server 202 can be the web server 1306 described below and configured with logic (e.g., via programming instructions) to process API calls submitted by clients to the key management service 204. While FIG. 2 illustrates a single web server, the web server 206 can be one of a fleet of web servers of the key management service 204, where the fleet incorporates one or more load balancers to allow for scalability and availability. The data storage service 208, in an embodiment, is a subsystem of the key management service that stores keys managed by the key management service on behalf of customers of a computing resource service provider that operates the key management service. In one embodiment, the data storage service 208 is a database system (e.g., a relational database system or a key-value store) that stores keys in association (e.g., by database row or otherwise) with identifiers of the keys. Such a database system can be one of the data stores discussed below in connection with FIG. 13. In another embodiment, the data storage service is a separate service from the key management service and the key management service interacts with the data storage service via API call (e.g., web service API call). The data storage service can also be a publicly available data storage service of the computing resource service provider. Generally speaking, the data storage service 208 operates so that key identifiers can be used to obtain respective encrypted copies of customer managed keys.

In an embodiment, keys stored in the data storage service 208 are encrypted so as to be undecryptable by anything other than an HSM of the key management service. In one embodiment, keys stored in the data storage service are individually encrypted (and/or in groups) by a domain key which, in an embodiment, is a secret shared among the HSMs of the fleet. The domain key can be unexportable from any HSM, meaning that there is no programmatic way (e.g., command that can be issued) to cause an HSM to provide the domain key in plaintext form. In this manner, keys stored in the data storage service 208 are effectively stored within the boundary of the HSMs of the fleet without using the physical storage of the HSMs themselves. In this manner, individual HSMs can operate without storing all customer keys, making the key management service scalable and able to handle more customer keys than an HSM can typically store internally.

The coordinator 210, in an embodiment, is a computer system (e.g., such as an application server described in connection with FIG. 13) configured with logic to perform management of the various cryptographic secrets utilized by the key management service. As an example, the coordinator can orchestrate the sharing of domain keys among HSMs in the fleet, can provision and de-provision HSMs from the fleet, can rotate domain keys (including reencrypting customer managed keys stored in the data storage service 208 to be encrypted under current domain keys), and perform other operations to manage the secrets used by the system.

Each HSM in the fleet 212 of HSMs, in an embodiment, is a device that provides hardware-based protection of cryptographic secrets so that, for example, physical intrusion into the HSM causes any cryptographic material stored by the HSM to be destroyed. An HSM can also include one or more cryptoprocessors to perform cryptographic operations using such secrets. In an embodiment, each HSM in the fleet 212 is compliant to the Federal Information Processing Standard (FIPS) Publication 140-2 and, in some embodiments, compliant with FIPS 140-2, levels 1, 2, 3, and/or 4.

In an embodiment, an HSM in the fleet 212 of HSMs can generate the second key according to criteria specified by a client 202 in identifying the second key. This generating of a key can be performed by using a CreateKey or GenerateDataKey API. In some instances, the API call has a different name such as GenerateDataEncryptionKey or KeysCreate API. Asymmetric key pairs can be performed by using a GenerateDataKeyPair or GenerateKeyPair API. In some instances, parameters for an API generating a key or key pair includes parameters such as a customer key data storage service identifier, key shape (key encryption information), location of the key, keyring (e.g., a set of keys or key identifiers), a description of the customer master key, the cryptographic operations to use the customer master key, the source of the key material for the customer master key, a key policy to attach to the customer master key, one or more tags, etc. Metadata can be associated with the master key to include identifiers of the customer to indicate their association with the master key. In an embodiment, a master key managed by the key management service 204, similar to key management service 104, for the customer is provided, when requested (e.g., in an API request with parameters indicating the selection of the key), to encrypt data and/or applications running on one or more web servers.

In some instances, criteria for generating a key includes bit length, allowable characters (e.g., letters, capitalization, numerical digits, and/or symbols), etc. Criteria for generating a key can also specify a key type, such as symmetric or asymmetric. The techniques described herein can also be extended to other cryptographic algorithms (including both symmetric and asymmetric algorithms). As discussed, numerous variations utilize symmetric and/or asymmetric cryptographic primitives. Symmetric key algorithms can include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms can also include those used to generate output of one way functions and include algorithms that utilize hash-based message authentication codes (HMACs), message authentication codes (MACs) in general, PBKDF2 and Bcrypt. Asymmetric key algorithms can also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve cryptographic (ECC) algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

As illustrated in FIG. 2, the key management service 204 and/or the client 202 can interact (e.g., via web service API calls or other requests) with other services, which can be services also operated by the same computing resource service provider that operates the key management service. Other services can include, but are not limited to, an identity and access management service to authenticate API calls and determine whether sufficient permissions exist to fulfill the API calls and a data storage service to store keys, such as described above.

Figure 3:
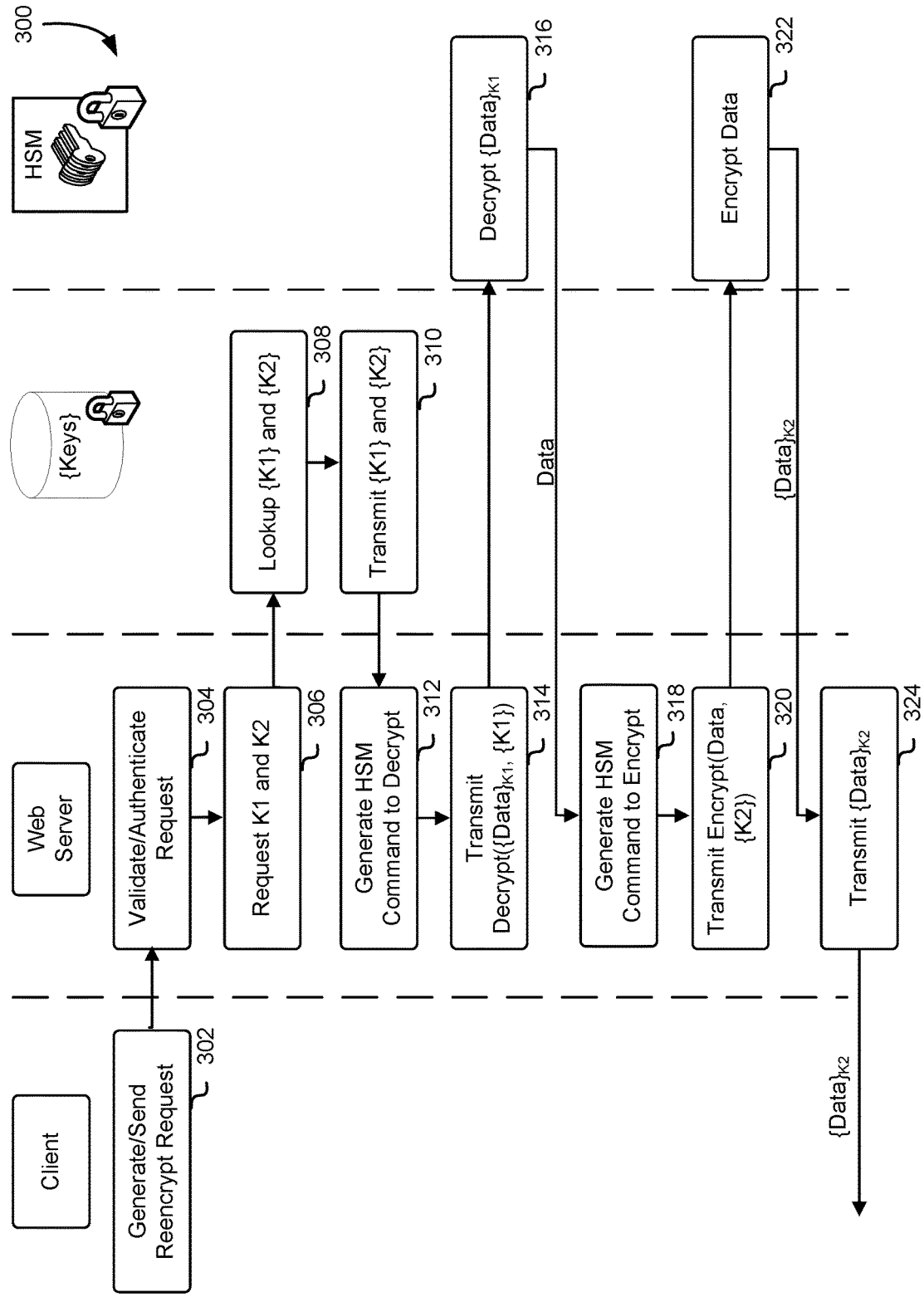
FIG. 3 shows an illustrative example of a process that, as a result of being performed by a web server, a data storage service, and a hardware security module (HSM), reencrypts data as requested by a client, in accordance with an embodiment.

FIG. 3 shows an illustrative example of a process that, as a result of being performed by a client, a web server, data storage service, and an HSM fleet, reencrypts a data objet, in accordance with an embodiment. A swim diagram 300 illustrates an embodiment of a system performing such a process. In an embodiment, to produce an effect illustrated in FIG. 1, a client generates and sends 302 a reencryption request. As described herein, a reencryption request can be an API call to a key management service hosting a web server, such as web server 206. A reencryption request 302 can be include parameters for reencrypting data, such as within a particular format. A request format can be in a JavaScript Object Notation (JSON) format. A parameter of a valid request can include the encrypted data, the key or key identifier to be used to decrypt the encrypted data, the algorithm for decryption, encryption context corresponding to the decryption key, the key or key identifier to be used to reencrypt the data, the algorithm for reencryption, and/or grant tokens. Ciphertext of the encrypted data can be a base64-encoded binary data object. In an example, the ciphertext blob requested for reencryption is of a minimum length of 1 byte and a maximum length of 6144 bytes. A key identifier can include the key identifier itself, a key resource name, alias name, and/or alias resource name. An encryption algorithm can include a symmetric encryption algorithm or an asymmetric encryption algorithm as described herein. Encryption context can include additional authenticated data, which can be used when encrypting and decrypting the data, such as to verify the authenticity of the reencrypt API call. A grant token can be used to validate the request to reencrypt data when the requesting entity otherwise lacks permission(s) to request the operation.

A web server validates and authenticates the client reencryption request 304, such as by confirming client credential information against stored information, such as user information 1316, including but not limited to account information, associated account role(s), account permission(s), key usage permission(s), etc. For example, a web server can validate that the customer initiating a reencrypt request 302 presents sufficient permissions to use the identified decryption key for decryption and the identified encryption key for encryption. A web server can validate that the client requesting encryption has sufficient permissions (e.g., by assumption of a role with sufficient permissions associated with the role) to allow data to be reencrypted. Validation can also include other operations, such as verifying that request-specified encryption algorithms are compatible with the request-specified decryption and encryption (source and destination) keys.

A client reencryption request can indicate the cryptographic keys to be used for decryption and encryption, such as by an identifier of a key or metadata of a key. When an identifier or metadata of a key is included in the reencryption request, a web server requests 306 the decryption key (e.g., K1, which can also be referred to as the source key, source customer managed key, or source customer master key) and the encryption key (e.g., K2 which can also be referred to as the destination key, destination customer managed key, or customer master key) from a data storage service 308. In an embodiment, an operation to lookup the decryption key and the encryption key 308 can be separated into separate operations, such as one database query to retrieve the decryption key and another database query to retrieve the encryption key. The decryption key can be a symmetric key or a portion of an asymmetric key, such as a private key. The encryption key can be a symmetric key or a portion of an asymmetric key, such as a public key.

A data storage service can provide the decryption key and encryption key as cryptographically wrapped keys or plaintext keys to a web server 310. With the decryption and encryption keys, a web server generates an HSM command for an HSM in the fleet of HSMs to decrypt the data object 312 In an embodiment, a command 312 can include both a decrypt command and an encrypt command to direct reencryption. The web server transmits the decrypt portion of the HSM command to an HSM of a fleet of HSMs 314.

A client reencryption request can indicate the cryptographic keys to be used for decryption and encryption, such as by an identifier of a key or metadata of a key. When an identifier or metadata of a key is included in the reencryption request, a web server requests the decryption key (e.g., K1) and the encryption key (e.g., K2) from a data storage service 308. The web server can request the keys in a single request or in two separate requests, depending on the interface of the data storage service. A data storage service can provide the decryption key and encryption key as cryptographically wrapped keys or plaintext keys to a web server 310. In an embodiment, the decryption key is a customer managed key of one type (e.g., symmetric or asymmetric) and the encryption key is a customer managed key of another type (e.g., asymmetric or symmetric). The types can be other types, such as both symmetric for use with different cryptographic algorithms (e.g., different bit lengths), asymmetric for use with different asymmetric cryptographic algorithms, or to utilize different encryption context.

With the decryption and encryption keys, a web server generates an HSM command for one or more HSMs in the fleet of HSMs to decrypt the data encrypted to the key identified by K1. The command to the HSM can be authenticated according to the interface of the HSM and can include an encrypted copy of the key identified by K1 (also referred to simply as the key K1 or simply K1). The encrypted copy of the key K1 can be encrypted to a domain key accessible to the HSM (e.g., stored securely within the HSM and shared as a secret with other HSMs in the fleet). The decrypt command (and other HSM commands) can be formatted according to a protocol used by the HSM for communication. In response to the decrypt command, an HSM in a fleet of HSMs decrypts the data object using the decryption key and provides the plaintext data object to the web server 316, such as by transmitting the plaintext data object over one or more secure communication links such as a TLS or other encrypted session. Upon receiving the plaintext data, in an embodiment, the web server generates a command for an HSM to encrypt the data 318 and transmits an encrypt command to the same HSM or a different HSM in the fleet of HSMs over one or more secure communication links 320. The HSM that receives the encrypt command encrypts the data object using the encryption key and provides the ciphertext data object to the web server 316, such as by transmitting the plaintext data object over one or more secure communication links 322.

The web server transmits the encrypted data to the requesting client 324. Transmitted reencrypted data can include response elements. Response elements can include the ciphertext corresponding to the reencrypted data, the encryption algorithm that was used to reencrypt the data, an identifier of the key used to reencrypt the data, the encryption algorithm that was used to decrypt the encrypted data before the data was reencrypted, and an identifier of the key used to decrypt the encrypted data before the data was reencrypted. A response can include the above data elements in JSON format. A response can also include a notification of generating the data key pair, such as an HTTP response.

If the reencrypt operation failed or encountered an error, an error response can be transmitted indicating a system timeout, an exception indicative of a key not being enabled, an invalid grant token, an invalid key customer managed key, unavailability of a customer managed key, an internal exception (e.g., by one or more bit flips caused by faulty hardware, environmental conditions (e.g., cosmic rays), or other reasons), unavailability of a specified resource, a rejected entity or source not found, or like computing errors. An error response can include an HTTP status code indicating the error, such as status code 400 or 500.

Figure 4:
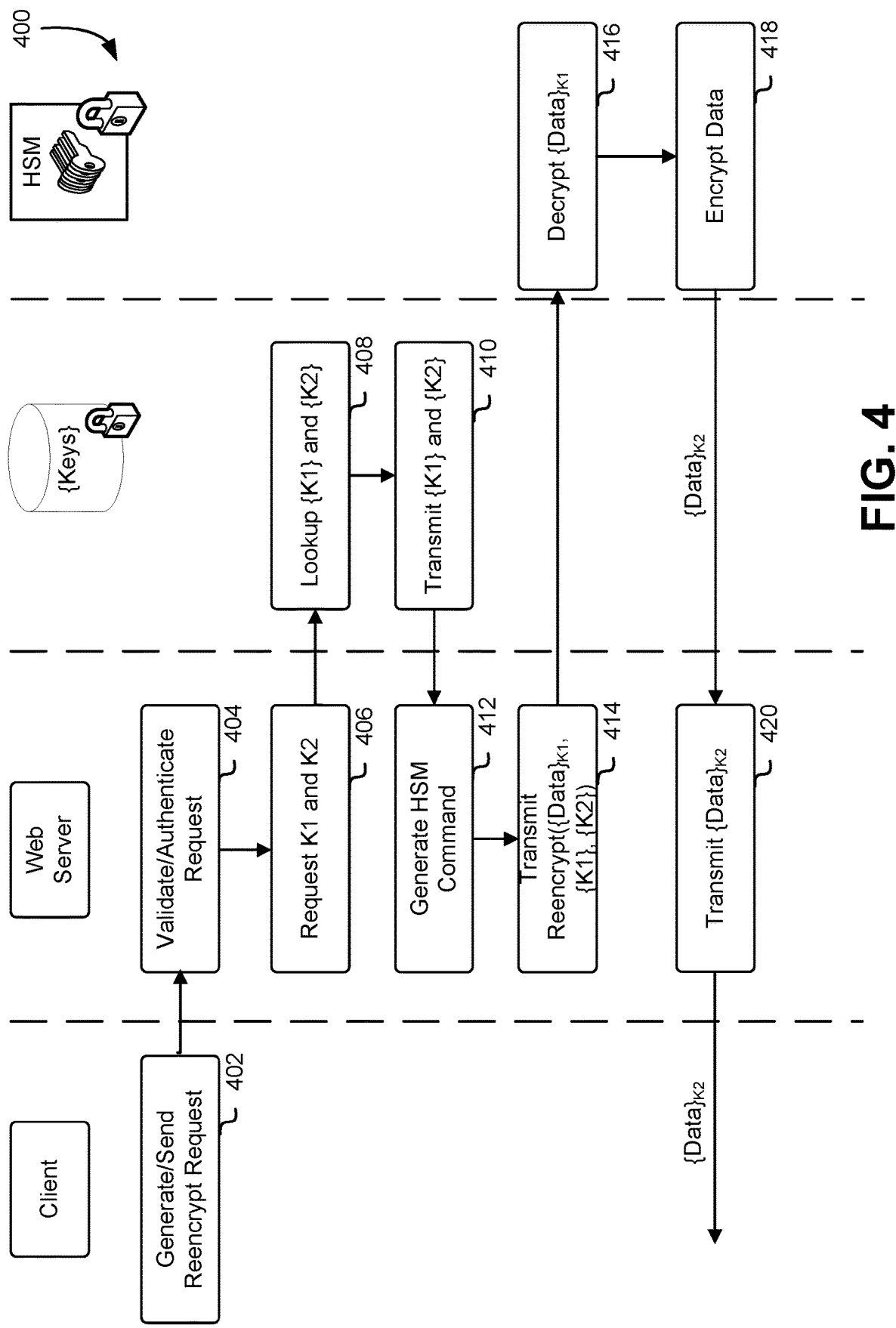
FIG. 4 shows an illustrative example of a process that, as a result of being performed by a web server, a data storage service, and a (HSM), reencrypts data as requested by a client within an HSM, in accordance with an embodiment.

FIG. 4 shows an illustrative example of a process that, as a result of being performed by a client, a web server, data storage service, and an HSM fleet, reencrypts a data objet, in accordance with an embodiment. A swim diagram 400 illustrates an embodiment of a system performing such a process wherein operations 402-410 are similar to operations 302-310 described above.

With the decryption and encryption keys transmitted by the data storage service 410, a web server generates an HSM command for one or more HSMs in the fleet of HSMs to reencrypt the data object within the HSM environment 412 using the decryption and encryption keys. The web server transmits the HSM command to one or more HSMs of a fleet of HSMs 414. An HSM of a fleet of HSMs decrypts the data object using the decryption key 416. An HSM of the fleet of HSMs encrypts the data object using the encryption key and transmits the encrypted data to the web server 418. One or more HSMs of a fleet of HSMs can verify that the data object encrypted using the encryption key can be decrypted using the encryption key. AN HSM of a fleet of HSMs transmits the data encrypted using the encryption key to the web server which then transmits the encrypted data to the requesting client 420. Transmitted reencrypted data 420 can include response elements such as described with transmitted reencrypted data 324 described above.

Note that the above reencryption processes described in swim diagrams 300 and 400 enable data encrypted under one key type to be reencrypted under a different key type so as to migrate the encryption information used to encrypt the data. For example, the decryption key can be a symmetric key for using one symmetric encryption algorithm and the encryption key can be a different symmetric encryption algorithm. In an embodiment, the decryption key can be a portion of an asymmetric key, such as a private key, and the encryption key can be a symmetric key. In an embodiment, the decryption key can be a symmetric key and the encryption key can be a portion of an asymmetric key, such as a public key. In an embodiment, the decryption key can be a portion of an asymmetric key, such as a private key, for using one asymmetric encryption algorithm and the encryption key can be a public key corresponding to a different asymmetric encryption algorithm. Reencryption can also utilize the same key for decryption and encryption while changing encryption context parameters, such as described above. Note also that the above reencryption processes described in swim diagrams 300 and 400 enable data to be reencrypted by service provider services without exposing the data to be reencrypted as plaintext to the client.

Figure 5:
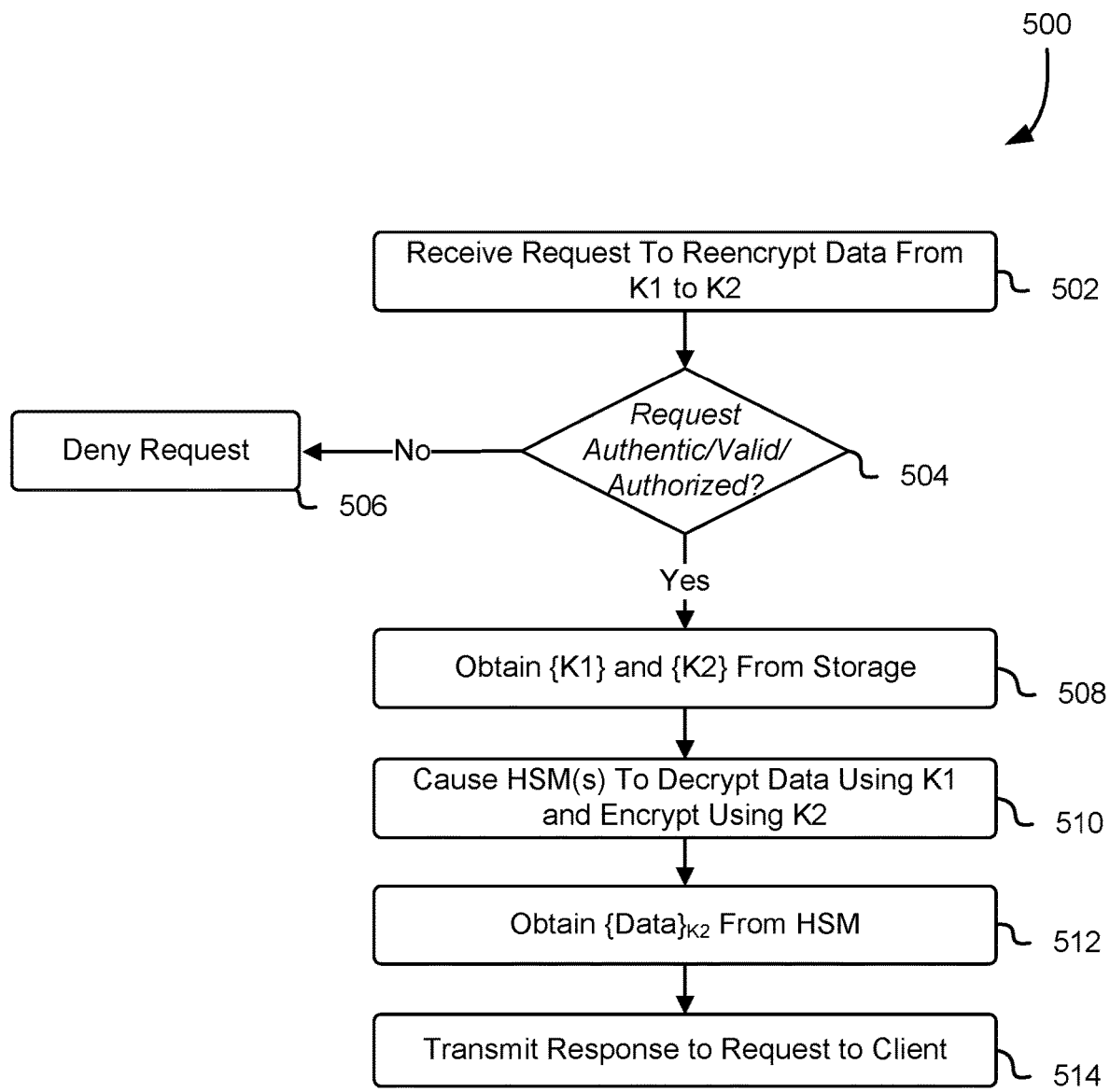
FIG. 5 is a flowchart depicting a process for reencrypting data.

FIG. 5 is a flow chart depicting a process 500 of a system for reencrypting data with an HSM. The process 500 can be performed by a web server of a key management service or another set of devices that processes requests to perform cryptographic operations. The web server receives 502 a request, such as by a client API call, to reencrypt data from a first key (e.g., K1) to a second key (e.g., K2). The key management service can determine 504 whether the request is authentic, valid, and/or authorized. For example, a request bearing a valid digital signature of a client generated using a key that the key management service trusts, such as a symmetric key shared as a secret between the client and the key management service or a public key of a key pair can be deemed authentic. A request can be validated by determining that fields of the ReEncrypt API are sufficient to perform a reencrypt operation, such as indicating the data object to be reencrypted, an identifier of a decryption key, and an identifier of an encryption key, and whether the encryption key and decryption key are customer managed keys that are managed by the key management service. A request can be validated by determining that fields of the ReEncrypt API are sufficient to perform a reencrypt operation, such as by determining that a key type (as described herein) of an encryption key can be used with a specified encryption algorithm.

A request can be authorized by determining that the requesting client submits credentials (e.g., a digital signature, username and proof of a password, or other such credentials) with associated sufficient permissions to allow the data object to be reencrypted or that the client is permitted to utilize the encryption and decryption keys. In an embodiment, an identity and access management service associates access control policies with key identifiers to define permissions for use of customer managed keys and determining whether fulfillment of the request is authorized can include determining if conditions of applicable access control policies are satisfied. If the client request is not authenticate, is not valid, or the requesting client is not authorized, then the key management service denies 506 the request.

If all conditions related to authenticity, validity, and authorization are met, in an embodiment, the key management service approves the request and proceeds to obtain the keys indicated by the client request. Based on the keys indicated by the client request, the web server obtains 508 the decryption key and encryption key from data storage. Data storage can include a data storage service 208 described above. A web server can obtain the keys as a result of a single query identifying the keys, or as a result of separate queries identifying the decryption key and the encryption key. With the decryption and encryption keys, the web server causes 510 an HSM of a fleet of HSMs to decrypt the requested data using the decryption key and causes one or more HSMs of a fleet of HSMs to encrypt the data using the encryption key. The web server can cause reencryption 510 by one or more commands directing the HSM to use the decryption key to decrypt the data and to use the encryption key to encrypt the data. The web server obtains 512 the reencrypted data from the HSM \. After obtaining the reencrypted data, the web server transmits 514 a response to the client. The response can comprise the data encrypted under the encryption key and can include other information, such as described above.

Numerous variations of the process 500 are considered as being within the scope of the present disclosure. For example, in some embodiment, the request to reencrypt data can include or otherwise specify (e.g., via uniform resource identifier (URI)) a set of data objects to be reencrypted where the data objects are individually encrypted. The set can comprise multiple data objects. In an embodiment, a request for reencryption of a batch of data objects identifies the corresponding identifiers of decryption keys to encrypted data objects and can identify one or more encryption keys corresponding to the indicated data objects targeted for reencryption. The identifiers for encryption and decryption keys can be specified for the whole batch or can be individually specified for each data object, where different objects can be specified to be encrypted and/or decrypted by different keys.

Figure 6:
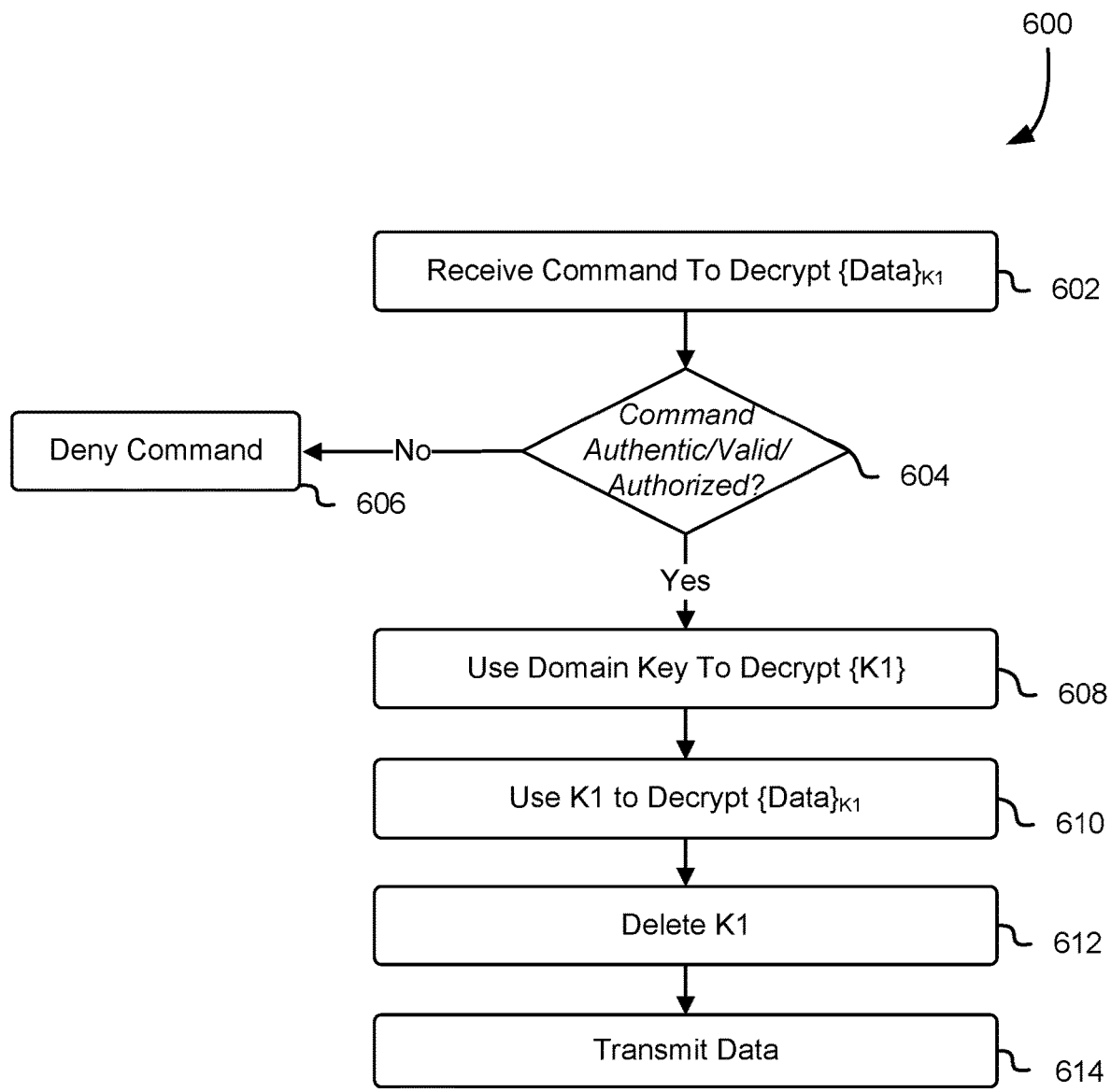
FIG. 6 is a flowchart depicting a process for decrypting data.

FIG. 6 is a flow chart depicting a process 600 of a system for decrypting data at an HSM. The HSM receives 602 a command, such as from a web server as described herein, to decrypt data using a decryption key (e.g., K1). The command can comprise the data encrypted under K1 and can comprise K1 encrypted under a domain key accessible to the HSM. The HSM can determine 604 whether the command is authentic, valid, and/or authorized, such as described above and/or according to the particular interface of the HSM. If the command is not authenticate/valid/authorized, then the HSM denies 606 the command.

If an HSM command for decryption is authentic/valid/authorized, in an embodiment, then the HSM proceeds to use 608 a domain key of the HSM to decrypt the decryption key. Using the plaintext decryption key, the HSM decrypts 610 the encrypted data. After obtaining the decrypted data, the HSM then deletes 612 the decryption key from the HSM. Note that deletion of the decryption key can be performed synchronously with performance of the process or asynchronously. For example, successful transmission of the data can trigger deletion of the key identified by K1 (synchronous) or the HSM performing the process 500 can cache the key identified by K1 to be used to fulfill a future command and eventually delete the key when it expires from the cache (asynchronous). In an embodiment, deletion can include overwriting memory storing the plaintext decryption key with zeroes, random and/or other data within the HSM and/or performing other operations, such as removing power to RAM or other memory that is dependent on a power source store data. The HSM transmits 614 the decrypted data to the web server or other device that issued the command.

Figure 7:
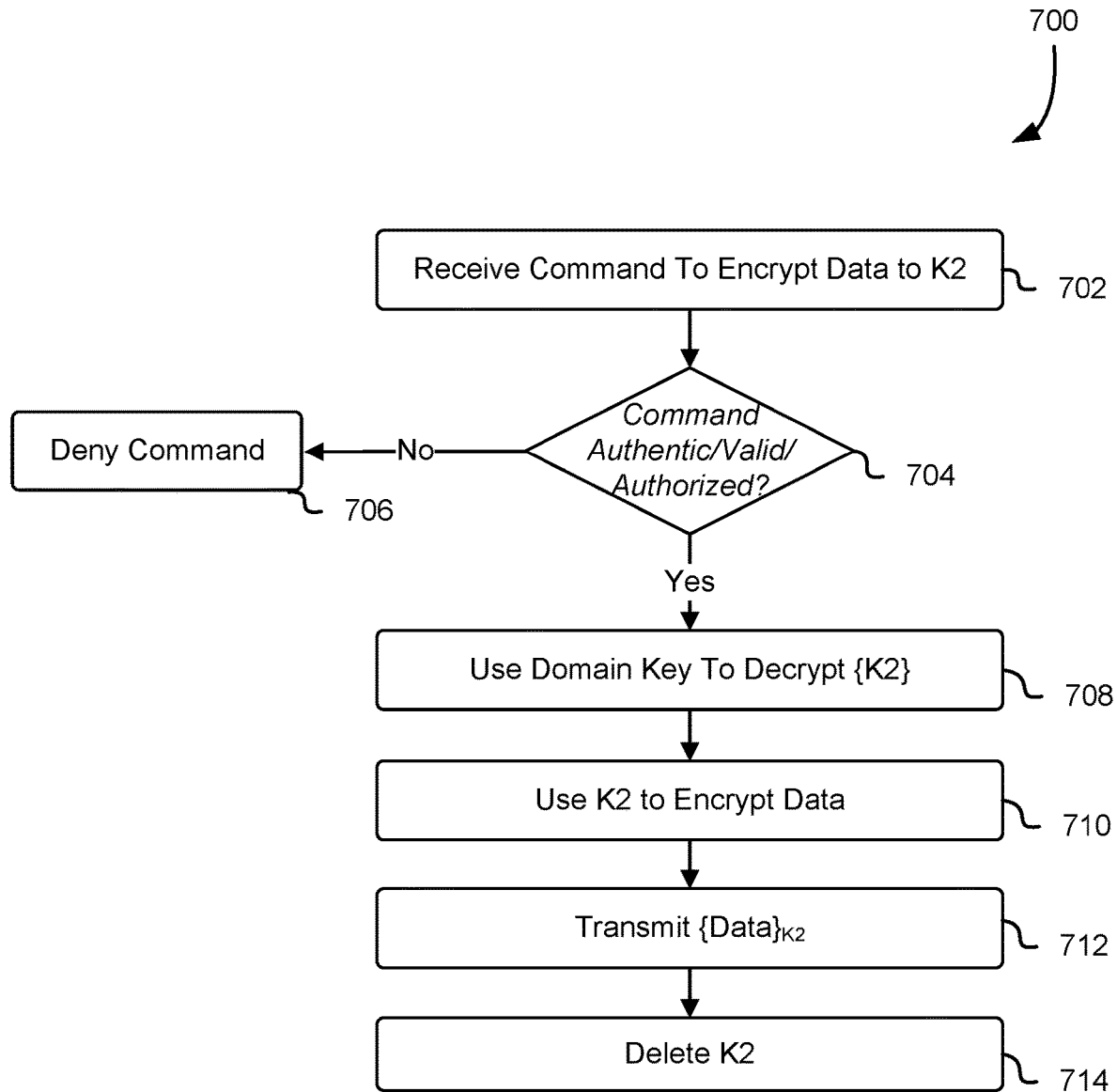
FIG. 7 is a flowchart depicting a process for encrypting data.

FIG. 7 is a flow chart depicting a process 700 of a system for encrypting data at an HSM. The HSM receives 702 a command, such as from a web server as described herein, to encrypt data using an encryption key (e.g., K2). The HSM can determine 704 whether the command is authentic, valid, and/or authorized as described above. If the command is not authenticate/valid/authorized, then the HSM denies 706 the command.

If the received HSM command for encryption is authentic/valid/authorized, in an embodiment, then the HSM uses a domain key of the HSM to decrypt 708 the encryption key. Using the plaintext encryption key, the HSM encrypts 710 the data. After obtaining the encrypted data, the HSM transmits 712 the encrypted data to the key management service. The HSM then deletes 714 the encryption key from the HSM environment, such as described above in connection with FIG. 6.

Note than in an example, such as illustrated in FIGS. 6 and 7, a command to an HSM indicating a decryption key or an encryption key can identify such a key by an identifier of a key or metadata of a key. When an identifier or metadata of a key is included in the reencryption request, a decryption key (e.g., K1) and the encryption key (e.g., K2) can be accessed from a data storage service, such as 308 described above. A request for keys can be in a single request or in two separate requests (e.g., a request for the decryption key and a separate request for the encryption key), in an example, depending on the interface of the data storage service. A data storage service can provide the decryption key and encryption key as cryptographically wrapped keys or plaintext keys to a web server or coordinator to communicate with the HSM. In an embodiment, the decryption key is a customer managed key of one type (e.g., symmetric or asymmetric) and the encryption key is a customer managed key of another type (e.g., asymmetric or symmetric). The types can be other types, such as both symmetric for use with different cryptographic algorithms (e.g., different bit lengths), asymmetric for use with different asymmetric cryptographic algorithms, or to utilize different encryption context.

Figure 8:
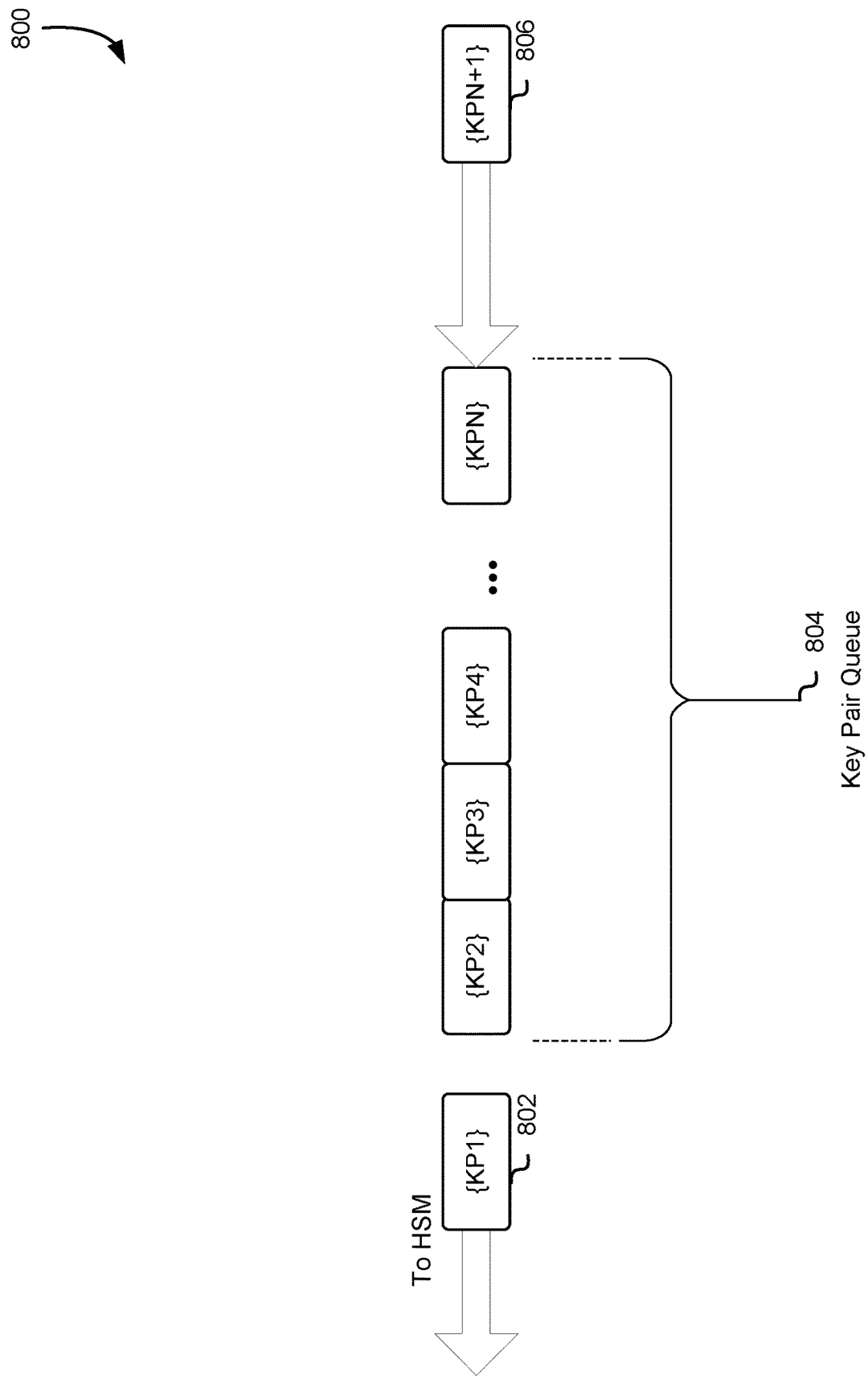
FIG. 8 is a block diagram of a queue of generated key pairs for an HSM.

FIG. 8 is a block diagram of a queue 800 of pregenerated key pairs. A queue 800 of pregenerated key pairs can be stored on an HSM. In an embodiment, a queue 800 of pregenerated key pairs can be stored by a key management service. A pregenerated key pair can be undecryptable by anything other than an HSM of a fleet of HSMs of the key management service. A queue stored on an HSM can include plaintext key pairs. In one embodiment, keys stored in the data storage service are individually encrypted (and/or in groups) by a domain key which, in an embodiment, is a secret shared among the HSMs of the fleet. The domain key cannot be exported beyond the boundary of HSMs of the fleet, meaning that there is no programmatic way (e.g., command that can be issued) to cause an HSM to provide the domain key in plaintext form. In this manner, keys stored beyond the boundary of the HSMs are effectively stored within the boundary of the HSMs of the fleet without using the physical storage of the HSMs themselves. In this manner, individual HSMs can operate without storing all customer keys, making the key management service scalable and able to handle more customer keys than an HSM can typically store internally.

A queue 800 can include a first available key pair 802 at the front of the queue. A first available key pair 802 can be generated by an HSM in advanced of a key management service requesting a generated key pair (also referred to as a "pregenerated" key pair). In an embodiment, an HSM generates N number of key pairs such that the queue of pregenerated key pairs includes KP1, KP2, KP3, KP4, . . . , KPN. The queue 800 can include a KPN+1 key pair, where the queue of pregenerated keys is not dependent on internal storage limits of the HSM as the queue of pregenerated keys are encrypted by a domain key of the HSM and the queue can be stored beyond the boundaries of the HSM. In an embodiment, N number of keys as indicated by KPN indicates the quantity of keys predicted by the key management service sufficient to serve a projected future quantity of web server API requests. In an embodiment, the key management service can monitor the idle state of an HSM, and if the HSM is idle, command the HSM to continue generating key pairs such that the queue 800 includes KPN+1.

In response to an API call requesting a key pair, a first available key pair 802 can be dequeued from a queue of available key pairs 804. Using a domain key as described above, an HSM decrypts the first available key pair 802 and provides the first available key pair 802 to a key management service. As a result of dequeueing the first available key pair 802, the HSM can generate an additional key pair 806 and add the additional key pair 806 to the queue of available key pairs 804. Note that generating an additional key pair 806 can be performed synchronously with performance of dequeueing the first available key pair 802 or asynchronously. For example, decrypting of the first available key pair 802 can trigger generation of an additional key pair to be added to the queue of available key pairs (synchronous) or the HSM performing the dequeueing can cache an instruction to be used by the HSM or another HSM of the fleet to generate an additional key pair, such as upon determining that an HSM is idle (asynchronous). Dequeueing a data key pair, such as available key pair 802, can be referred to preventing such pregenerated data key pair from being provided in response to a subsequent or other API request for an available data key pair.

A key pair can comprise a public key and a corresponding private key. A key pair can be utilized by the key management service or a customer. In an embodiment, a key pair can be requested by an API call specifying a managed key by which to wrap the requested key pair. The managed key can be managed by the key management service (referred to as a managed key or a customer managed key) and responses to customer API requests identifying the managed key can include a copy of the private key of the requested key pair encrypted to the customer managed key. In an embodiment, a response to a customer API request to generate a key pair for local use can include a plaintext public key and an encrypted private key decryptable by the customer. The encrypted private key can then be transmitted to the key management service to be decrypted by the customer managed key and provided back in plaintext form for use by the customer. The customer can then use the private key in cryptographic operation without submitting an API call to the key management service. Accordingly, a customer can use such an exported key pair for cryptographic operations outside of the key management service, such as for local digital signatures, verifying signatures, or for local encryption and decryption.

Figure 9:
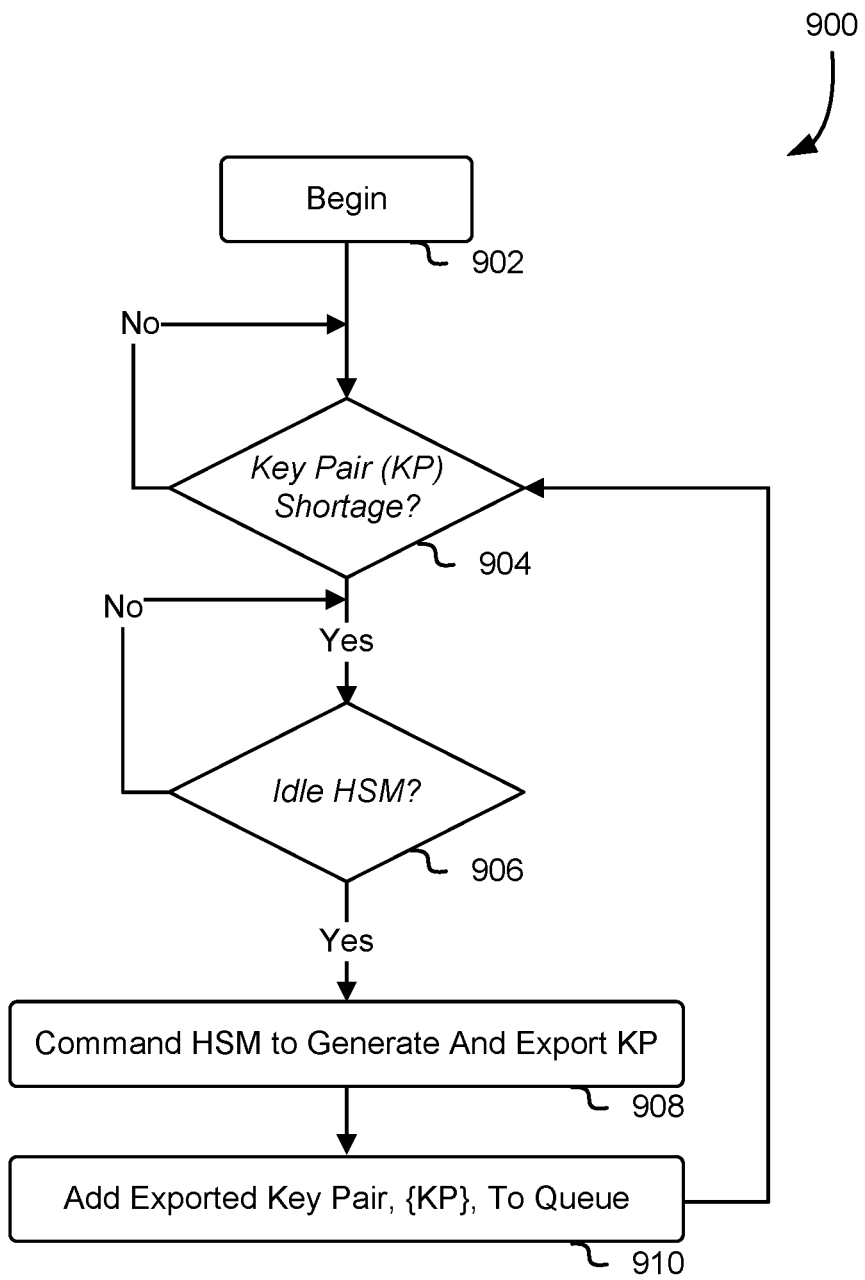
FIG. 9 is a flowchart depicting a process for generating a key pair.

FIG. 9 is a flowchart depicting a process 900 of a system for generating a key pair. A coordinator of a key management service, such as coordinator 210, begins to manage or monitor 902 a queue comprising pregenerated key pairs, such as queue 800 describe above. The key management service determines 904 whether there is a shortage of key pairs. In an embodiment, a coordinator performs the determination 904. A shortage of key pairs can be caused by an actual or projected future quantity of web service application programming interface (API) requests for unused key pairs exceeding a quantity of available key pairs. In an embodiment, a shortage can be related to a type of key pairs, such as key pairs generated according to various cryptographic algorithms or according to particular parameters (e.g., bit length). For example, various types of key pairs can include RSA keys (such as of bit lengths including 2048, 3072, or 4096) and elliptical curve cryptography keys (ECC) (including prime curves, such as P-256, P-384, P-521, or their inverses of National Institute of Standards and Technology (NIST); or Koblitz curves, such as P-256 K1 of Standards for Efficient Cryptography Group (SECG)). In other words, a key pair shortage can be caused by a number of pregenerated key pairs being insufficient for a future interval of time, which can be based on projections based on past usage and/or trends in past usage.

In an embodiment, a subservice of a key management service, such as a coordinator, can predict a quantity of key pairs sufficient to serve a predicted quantity of future web service API requests to be received within a defined time period based on a notification from a client of a scheduled quantity of future API requests involving unused key pairs, such as for reencryption. In an embodiment, a key management service can predict a quantity of potential future web service API requests involving unused key pairs based on direct measurements of past web service API requests involving unused key pairs, an approximation function, a heuristic, and/or other such statistical technique for modeling future usage patterns. For example, in an embodiment where some or all of the probabilities indicative of past web service API requests involving unused key pairs cannot be measured, the key management service can estimate such potential load of web service API requests derived from the alternative cryptographic operations performed by the key management service, an HSM of a fleet of HSMs, and/or other such sources. The key management service can also generate probabilities for future quantities of web service API requests in excess of available key pairs based on key management service system functions, estimation, random sampling and/or other such techniques. As can be contemplated, the methods and/or techniques illustrated herein for assigning probabilities are illustrative examples and other such methods and/or techniques can be considered as within the scope of the present disclosure.

If a coordinator, such as coordinator 210, of the key management service determines there is not a key pair shortage, the coordinator can continue to monitor (e.g., by repeatedly determining 904 whether there is a shortage, perhaps at predefined intervals of time) until a shortage is determined. If a coordinator determines 904 there is a key pair shortage, the coordinator then determines 906 whether there is an idle HSM of a fleet of HSMs to generate one or more additional key pairs (e.g., to add to a queue 800, discussed above). If there is not an HSM idle, the key management service can continue to monitor (e.g., by repeatedly determining 906 whether any HSM of a fleet of HSMs is idle, perhaps at predefined intervals of time) until an idle HSM is identified. In an embodiment, if an HSM is not idle, the key management service can return to determining 904 whether a key pair shortage exists (e.g., an HSM self-initiated pregenerating a key pair). If the HSM is idle, then the coordinator selects an HSM of the fleet of HSMs and commands 908 the selected HSM to generate a key pair and export 908 the key pair to the key management service. In an embodiment, and as a result of determining 904 a key pair shortage exceeds one additional key, a coordinator can select multiple HSMs of the fleet to command to generate and export sufficient key pairs. In an embodiment, a determined 904 key pair shortage can outweigh a determination 906 that an HSM is idle or otherwise prioritize key pair generation, such that the HSM is commanded by the key management service to generate an additional key pair.

An HSM can generate the key pair and encrypt the key pair with a key shared within the boundaries of the fleet of HSMs (e.g., a domain key) such that the key pair is only decryptable within the boundaries of the fleet of HSMs (such as described above). The key management service can add 910 the exported key pair encrypted under the HSM key to the queue of pregenerated key pairs or other such storage mechanism. In an embodiment, the key management service stores pregenerated key pairs in a queue, such as queue 800. A key management service can respond to requests to generate data key pairs, in part, by dequeuing a data key pair from the queue. In an embodiment, separate queues can be employed to organize pregenerated key pairs of varying types by key pair type.

In an embodiment, each web server of a plurality of web servers within a key management service can store a queue of pregenerated key pairs, such that the key pairs are encrypted to a domain key shared by the fleet of HSMs. With each web server storing a different queue of pregenerated key pairs, the key management service can avoid challenges of synchronizing a single queue among the plurality of web servers. When a web server detects a shortage of available pregenerated key pairs on the queue local to the web server, the web server can command one of the HSMs in the fleet for additional key pairs, such as described above.

Figure 10:
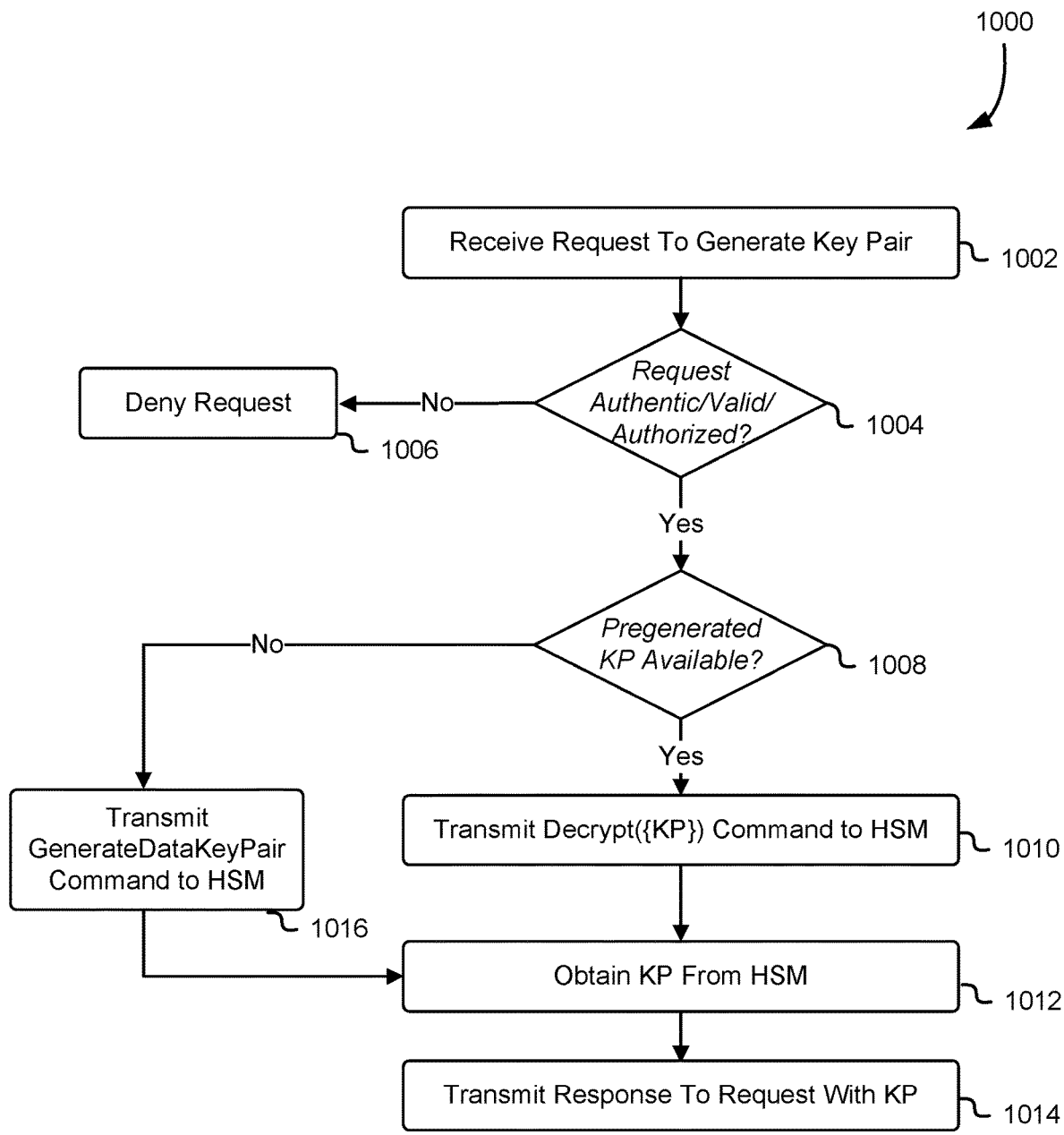
FIG. 10 is a flowchart depicting a process for obtaining a key pair.

FIG. 10 is a flowchart depicting a process 1000 for obtaining a key pair from an HSM of a fleet of HSMs. A web server of a key management service can receive 1002 a request to generate a data key pair. The request can originate from a client, subservice of the key management service, or another service hosted by a service provider. If all conditions related to authenticity, validity, and authorization are met (such as described above, e.g., 504 and 604), in an embodiment, then the web server approves 1004 the request and proceeds to determine 1008 whether pregenerated key pairs are available. Otherwise, the web server denies 1006 the request.

A valid request can be include parameters for generating a key pair, such as within a particular format. A request format can be in a JavaScript Object Notation (JSON) format. A parameter of a valid request can include a symmetric key or symmetric key identifier for the generated data key pair to be wrapped. Such a symmetric key can be trusted by a customer requesting the data key pair be generated and the key management service. Parameters of a valid request can include a resource name (such as a computing resource that can utilize the data key pair to be generated), alias name, and/or alias resource name. Key pair specification(s) can be included in the request, such as to specify an encryption algorithm, so as to use RSA keys (such as of bit lengths including 2048, 3072, or 4096) or elliptical curve cryptography keys (ECC) (including prime curves, such as P-256, P-384, P-521, or their inverses of National Institute of Standards and Technology (NIST); or Koblitz curves, such as P-256 K1 of Standards for Efficient Cryptography Group (SECG)). A request can include encryption context, including additional authenticated data, which can be used when encrypting the private key of the data key pair, such as to verify the authenticity of the GenerateDataKeyPair API call. A request for a key pair can include a grant token or list of grant tokens, where a grant token can be used to validate the request to generate a data key pair when the requesting entity otherwise lacks permission(s) to request the operation.

The web server, such as web server 206, can submit a web service API call to a coordinator, such as coordinator 210, to determine 1008 whether sufficient pregenerated key pairs are available, such as to respond to a request involving reencryption utilizing unused key pairs. In an embodiment, the determination of whether sufficient pregenerated key pairs are available causes a web service API call to a data storage service, such as 208, to access a stored queue of pregenerated key pairs. In an embodiment, the determination of whether sufficient pregenerated key pairs are available causes a web service API call to an HSM of the fleet to access a stored queue of pregenerated key pairs stored within the boundaries of the HSM fleet.

If a pregenerated key pair is not available, then the web server can transmit 1016 a GenerateDataKeyPair command to an HSM. If a pregenerated key pair is available, then the web server can transmit 1010 a command to an HSM to decrypt the available pregenerated key pair. The HSM can decrypt the pregenerated key pair using a key within the boundaries of a fleet of HSMs (e.g., domain key). In an embodiment where the web server transmitted 1016 a GenerateDataKeyPair command to the HSM, the HSM can generate a key pair in response to the command and maintain the key pair as decrypted to provide to the coordinator of the key management service. The coordinator then obtains 1012 the decrypted key pair from the HSM. In an embodiment, a customer requested key pair can be encrypted with a managed key (as described above) such that responses to the customer request can include a copy of the private key of the key pair encrypted to the customer managed key. As a result of the coordinator obtaining 1012 the key pair, the web server can transmit 1014 a response to the received request with the key pair.

A response to a request for generating a data key pair can include a key identifier for the asymmetric key, key pair specification(s) (as described above), the private key encrypted under a requestor key (e.g., a customer symmetric key such as described above), the private key in plaintext, and the public key in plaintext. A response can include the above data in JSON format. A response can also include a notification of generating the data key pair, such as an HTTP response.

If the generate data key pair operation failed or encountered an error, an error response can be transmitted indicating a system timeout, an exception indicative of a key not being enabled, an invalid grant token, an invalid key customer managed key, unavailability of a customer managed key, an internal exception (e.g., by one or more bit flips caused by faulty hardware, environmental conditions (e.g., cosmic rays), or other reasons), unavailability of a specified resource, a rejected entity or source not found, or like computing errors. An error response can include an HTTP status code indicating the error, such as status code 400 or 500.

Figure 11:
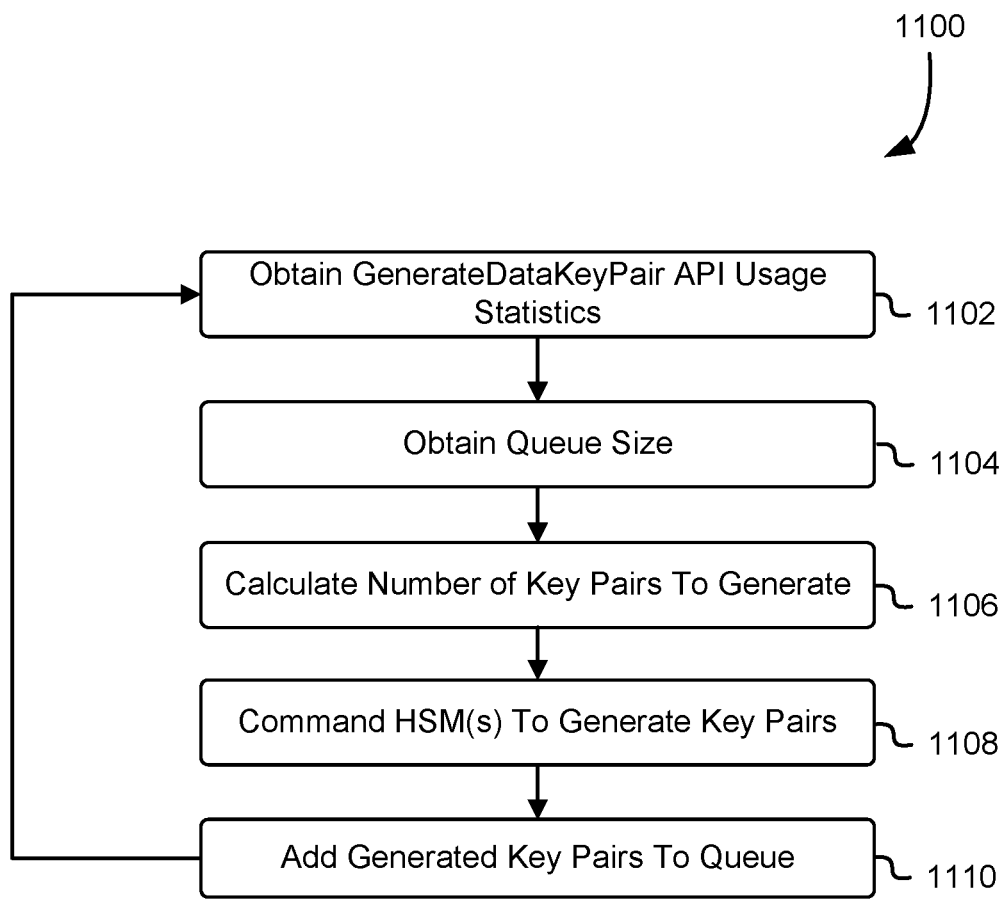
FIG. 11 is a flowchart depicting a process for pregenerating a key pair.

FIG. 11 is a flowchart depicting a process 1100 for pregenerating a key pair based on usage statistics. A key management service can obtain 1102 statistics of past instances of GenerateDataKeyPair API calls. Statistics of past instances of GenerateDataKeyPair API calls can be based on direct measurements of such API calls, an approximation function, a heuristic, and/or other such statistical technique for modeling future usage patterns based on past usage behavior. For example, in an embodiment where some or all of the probabilities indicative of past GenerateDataKeyPair API calls cannot be measured, the key management service can estimate such potential load of API calls derived from alternative cryptographic operations performed by the key management service, an HSM of a fleet of HSMs, and/or other such sources. The key management service can also generate probabilities for future quantities of GenerateDataKeyPair API calls in excess of available key pairs based on key management service system functions, estimation, random sampling and/or other such techniques. In an embodiment, statistics of GenerateDataKeyPair API calls can be organized by a type of key pair specified by the API calls, such as key pairs generated according to various cryptographic algorithms or according to particular parameters (e.g., bit length). For example, various types of key pairs can include RSA keys (such as of bit lengths including 2048, 3072, or 4096) or elliptical curve cryptography keys (ECC) (including prime curves, such as P-256, P-384, P-521, or their inverses of National Institute of Standards and Technology (NIST); or Koblitz curves, such as P-256 K1 of Standards for Efficient Cryptography Group (SECG)). As can be contemplated, the methods and/or techniques illustrated herein for assigning probabilities are illustrative examples and other such methods and/or techniques can be considered as within the scope of the present disclosure.

The key management service can obtain 1104 the queue size of available pregenerated key pairs. For example, a coordinator of the key management service can determine the size of a queue by determining the number of key pairs stored within a queue. The queue can be stored in memory accessible to the coordinator, in a data storage service, within the boundaries of an HSM fleet, or other suitable data storage accessible to the key management service. In an embodiment, a coordinator submits a web server API call to the applicable service hosting the data storage containing the queue requesting the size of a queue. A separate queue can be stored for various types of key pairs. For example, a coordinator can submit a web server API call to an HSM requesting that the HSM provide the quantity of available key pairs pregenerated according to RSA-256.

Based on the obtained statistics of past GenerateDataKeyPair API calls and the available key pairs in the queue, the coordinator calculates 1106 the number of key pairs to generate to satisfy a projected future quantity of GenerateDataKeyPair API calls. In an embodiment, the coordinator can also calculate the number of key pairs to generate based on information provided by a customer indicating projected future utilization of key pairs. An M number of key pairs to be generated can be calculated by at least M=K−N where K represents a number of requests involving pregenerated key pairs and N represents a number of key pairs available in a queue, such as queue 800 described above.

Based on the calculated number of key pairs to generate, the coordinator commands 1108 an HSM of the fleet to generate the calculated number of key pairs. In an embodiment, the coordinator can distribute the calculated number of key pairs to be generated among a plurality of HSMs of the fleet. As described above at 906, the coordinator can determine which HSM to command to generate a key pair based on the HSM being in an idle state. Upon obtaining the generated key pair from the HSM, the coordinator causes the generated key pair to be added 1110 to a queue of available pregenerated key pairs. As described herein, the queue can be a queue for particular key pair types and/or a queue stored within memory of a particular web server, an HSM, data storage service, or other suitable data storage container.

Figure 12:
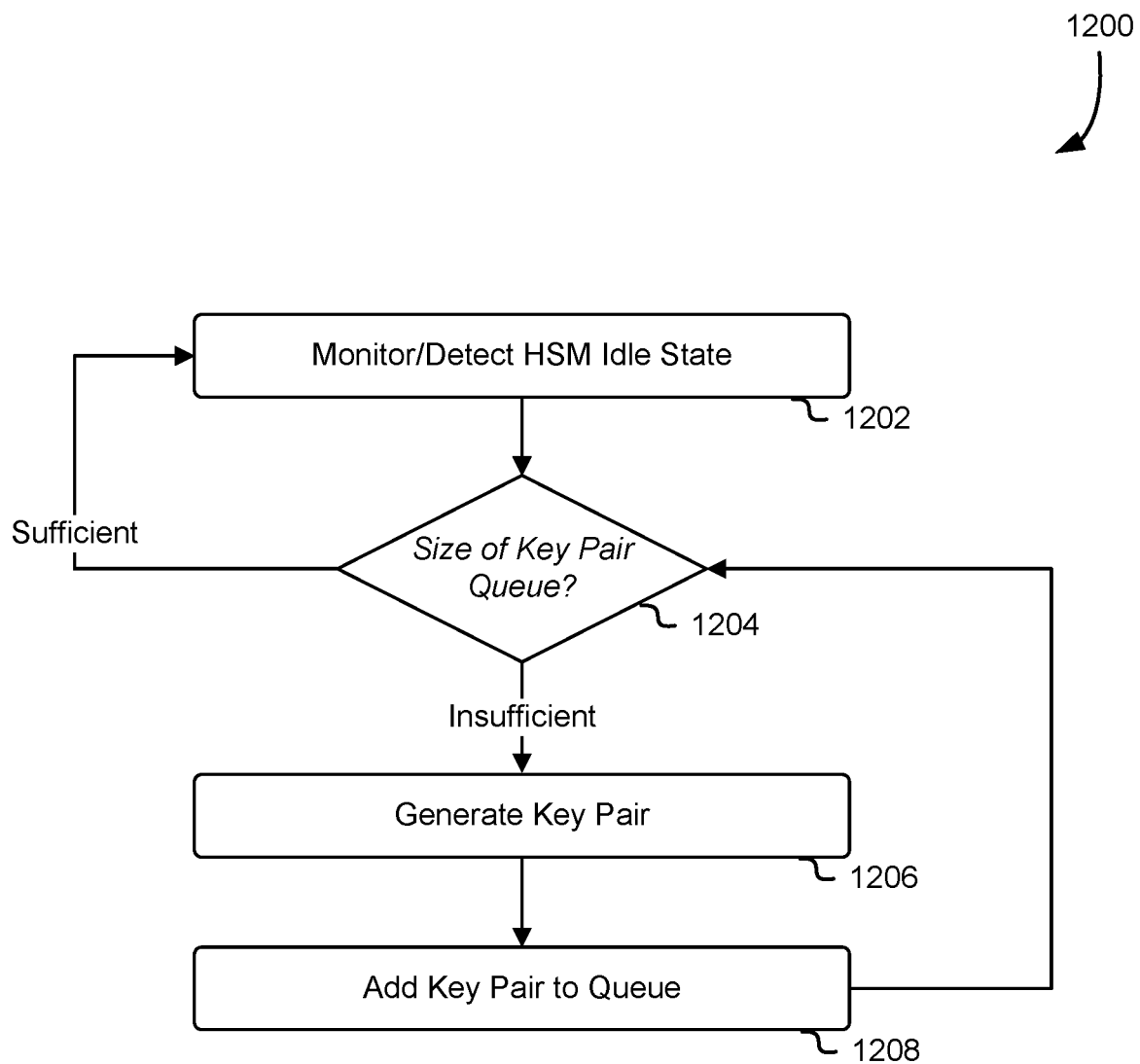
FIG. 12 is a flowchart depicting a process for pregenerating a key pair.

FIG. 12 is a flowchart depicting a process 1200 for pregenerating a key pair. An HSM monitors or detects 1202 its idle state. When the HSM is not performing cryptographic operations or responding to, for example, a web server API call, the HSM can be referred to be in an idle state. If the HSM is idle, the HSM determines 1204 the size of a queue of available pregenerated key pairs. The HSM can determine 1204 the size of a queue by calculating the total number of available pregenerated key pairs stored in the queue or the number of available pregenerated key pairs of a particular type. The queue can be stored on an HSM or distributed among the fleet of HSMs. If the size of the queue is sufficient the HSM can return to monitoring or detecting its idle state. The size of the queue can be referred to as sufficient if, for example, the quantity of key pairs meets or exceeds a statistical quantity of GenerateDataKeyPair API calls received by the HSM in the past.

If the size of the queue is insufficient, the HSM generates 1206 a key pair. The size of the queue can be referred to as insufficient if the size of the queue indicates a shortage, such as determined by 904 described above. In an embodiment, the size of the queue can be insufficient when a first available key pair, such as 802, reduces the size of the queue. The HSM then adds 1208 the generated key pair to the queue. The pregenerated data key pair can be stored securely outside of hardware security module (HSM) boundaries (e.g., by being stored encrypted by a secret that is unexportably maintained securely within HSM boundaries and) or within the boundaries of an HSM itself. In some examples, each HSM in a fleet of HSMs stores pregenerated data key pairs unexportably within its boundaries. Other variations, including those discussed herein, such as storing the encrypted key pairs by the key management service outside the boundaries of an HSM, are considered as being within the scope of the present disclosure.

Figure 13:
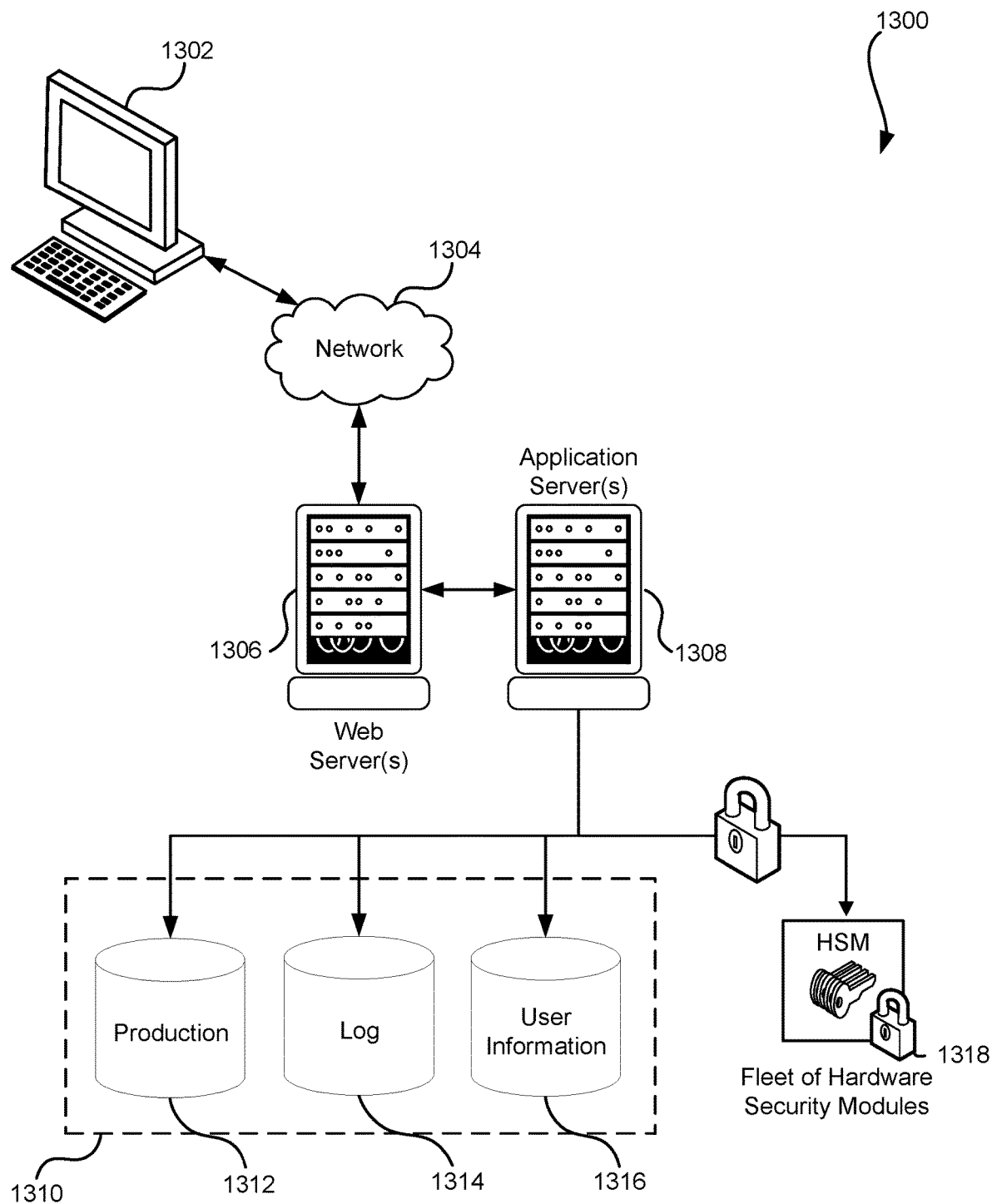
FIG. 13 illustrates a system in which various embodiments can be implemented.

FIG. 13 illustrates aspects of an example system 1300 for implementing aspects in accordance with an embodiment. As will be appreciated, although a web-based system is used for purposes of explanation, different systems can be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310, and it should be understood that there can be several application servers, layers or other elements, processes or components, which can be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface ((API) requests) over a network. As used herein, unless otherwise stated or clear from context, the term "data store" refers to any device or combination of devices capable of storing, accessing and retrieving data, which can include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, a fleet of hardware security modules 1318 illustrated includes mechanisms for decrypting information, including ciphertext of encrypted data and encrypted cryptographic keys, and encrypting information, such as to encrypt plaintext data and wrap cryptographic keys, which can comprise one or more steps of a reencryption process described herein. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto, and the application server 1308 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1302. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments can become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a web server providing an interface of a key management service, a web service application programming interface request to generate a data key pair;
   obtaining an encrypted client managed key specified by a parameter of the request;
   at a hardware security module (HSM) of the key management service:
      decrypting the encrypted client managed key;
      selecting a queue from a plurality of queues of different types of key pairs according to a type of data key pair specified in the request;
      removing a pregenerated data key pair from the selected queue, the pregenerated data key pair comprising a public key and a private key;
      providing the pregenerated data key pair to be included with a response to the request; and
      encrypting the pregenerated data key pair using the decrypted client managed key, resulting in an encrypted data key pair; and
   transmitting, from the web server, the response including the encrypted data key pair.

2. The computer-implemented method of claim 1, wherein the encrypted client managed key is obtained as a result of being specified by a parameter of the request.

3. The computer-implemented method of claim 2, wherein the parameter indicates the encrypted client managed key is to be obtained from a client storage location outside of the key management service.

4. The computer-implemented method of claim 1, wherein selecting the queue is based at least in part on the request specifying the type of data key pair.

5. The computer-implemented method of claim 1, wherein the plurality of queues comprises a first queue corresponding to a first cryptographic algorithm and a second queue corresponding to a second cryptographic algorithm, the first cryptographic algorithm different from the second cryptographic algorithm.

6. The computer-implemented method of claim 1, further comprising:
   detecting, as a result of transmitting the response, the HSM is idle;
   determining an availability of key pairs in the selected queue is below a threshold;
   generating an additional key pair of the type consistent with the selected queue; and
   adding the additional key pair to the selected queue.

7. The computer-implemented method of claim 6, wherein the threshold is determined based on a usage pattern of requests received by the HSM within a time interval.

8. The computer-implemented method of claim 1, further comprising generating a quantity of additional key pairs based on a notification from a client indicating a schedule of future requests.

9. A system, comprising:
   one or more processors; and
   memory that stores computer-executable instructions that are executable by the one or more processors to cause the system to:
      obtain a request to generate a data key pair; and
      fulfill the request by at least:
         obtaining, by commanding a hardware security module (HSM) to provide one of a plurality of pregenerated data key pairs internally stored by the HSM, a pregenerated data key pair;
         performing an operation to prevent the pregenerated data key pair from being provided in response to another request; and
         providing the pregenerated data key pair.

10. The system of claim 9, wherein the instructions further cause the system to:
   obtain an encrypted client managed key specified by the request;
   by the HSM:
      decrypt the encrypted client managed key; and
      encrypt the pregenerated data key pair using the decrypted client managed key, resulting in an encrypted data key pair; and
   provide the pregenerated data key pair by transmitting a response to the request, the response including the encrypted data key pair.

11. The system of claim 10, wherein the encrypted client managed key is obtained from a client storage location outside of the HSM.

12. The system of claim 10, wherein the instructions further cause the system to:
select a queue from a plurality of queues of different types of key pairs according to a type of data key pair indicated in the request; and
perform the operation by removing the pregenerated data key pair from the selected queue.

13. The system of claim 12, wherein the instructions further cause the system to select the queue based at least in part on information in the request specifying the type of data key pair.

14. The system of claim 9, wherein the instructions that cause the system to:
detect, as a result of providing the pregenerated data key pair, the HSM is idle;
determine a shortage of pregenerated key pairs; and
as a result of the HSM being idle, generate, by the HSM, one or more additional key pairs sufficient to resolve the shortage.

15. A non-transitory computer-readable storage medium storing thereon executable instructions that, as a result of being executed by one or more processors of a computer system, cause a first computer system to at least:
perform a set of operations to remove a pregenerated data key pair from a plurality of pregenerated data key pairs, the pregenerated data key pair comprising a public key and a private key;
generate a response to a request to generate a data key pair that comprises the removed pregenerated data key pair, at least by:
obtaining an encrypted client managed key;
decrypting the encrypted client managed key;
selecting a queue of a plurality of queues of different types of key pairs;
removing the pregenerated data key pair from the selected queue; and
encrypting the pregenerated data key pair using the decrypted client managed key, resulting in an encrypted data key pair; and
transmit the response to the request, the response including the encrypted data key pair.

16. The non-transitory computer-readable storage medium of claim 15, wherein the encrypted client managed key is obtained from a storage location outside of the computer system.

17. The non-transitory computer-readable storage medium of claim 15, wherein the queue is selected based at least in part on the request specifying the type of data key pair.

18. The non-transitory computer-readable storage medium of claim 15, wherein the instructions further cause the computer system to:
determine a shortage of key pairs in the selected queue;
generate one or more additional key pairs of the type consistent with the selected queue to resolve the determined shortage; and
add the one or more additional key pairs to the selected queue.

19. The non-transitory computer-readable storage medium of claim 18, wherein the instructions further cause the computer system to detect an idle state, and wherein the shortage is determined as a result of detecting the idle state.

20. The non-transitory computer-readable storage medium of claim 18, wherein the shortage is determined based on a prediction of future requests to be received by the computer system within a time interval, the prediction based on past usage of the computer system.

* * * * *